US011769045B2

(12) United States Patent
Hsu

(10) Patent No.: US 11,769,045 B2
(45) Date of Patent: Sep. 26, 2023

(54) METHOD TO IDENTIFY ACOUSTIC SOURCES FOR ANTI-SUBMARINE WARFARE

(71) Applicant: Nokomis, Inc., Canonsburg, PA (US)

(72) Inventor: Jennting Timothy Hsu, Bethel Park, PA (US)

(73) Assignee: Nokomis, Inc, Canonsburg, PA (US)

( * ) Notice: Subject to any disclaimer, the term of this patent is extended or adjusted under 35 U.S.C. 154(b) by 1150 days.

(21) Appl. No.: 16/234,010

(22) Filed: Dec. 27, 2018

(65) Prior Publication Data

US 2020/0209339 A1    Jul. 2, 2020

(51) Int. Cl.
*G06N 3/08* (2023.01)
*G06F 18/21* (2023.01)

(52) U.S. Cl.
CPC ............ *G06N 3/08* (2013.01); *G06F 18/217* (2023.01); *G06F 2218/04* (2023.01)

(58) Field of Classification Search
CPC .. G01H 3/04; G01H 9/00; G06N 3/08; G06N 3/0481; G01S 5/02; G06F 18/21
See application file for complete search history.

(56) References Cited

U.S. PATENT DOCUMENTS 10,460,191 B1 * 10/2019 Pribble .............. H04N 1/40068
2015/0287422 A1 * 10/2015 Short ........................ G01S 3/74
704/211

FOREIGN PATENT DOCUMENTS

CN          106595836    * 4/2017  ............... G01H 3/04

* cited by examiner

*Primary Examiner* — Yosef K Laekemariam
(74) *Attorney, Agent, or Firm* — Alexander Pokot; AP Patents

(57) ABSTRACT

A method to detect the presence and location of submarines in a complex marine environment by wavelet denoising, wavelet signal enhancement, by autocorrelation and signal source identification a convolutional neural network.

24 Claims, 6 Drawing Sheets

METHOD TO IDENTIFY ACOUSTIC SOURCES FOR ANTI-SUBMARINE WARFARE

FEDERALLY SPONSORED RESEARCH OR DEVELOPMENT

N/A

REFERENCE TO SEQUENCE LISTING, A TABLE, OR A COMPUTER PROGRAM LISTING COMPACT DISC APPENDIX

N/A

BACKGROUND OF INVENTION

Identifying the signal sources in noisy marine environments is especially difficult because the propagation of sound is further distorted by relatively more dense layers of water, interference and reflectivity of subsurface features.

BRIEF SUMMARY OF INVENTION

The technical problem is to passively monitor maritime space for the underwater passage of submarines. The solution for identifying the source of an acoustic signals such as submarines in a noisy environment uses as illustrated in FIG. 1, wavelet denoising, signal source enhancement by autocorrelation, signal source isolation by curve fitting, and processing by a machine learning classifier such as a convolutional neural network (CNN). Autocorrelation is especially effective in preserving the integrity of the signal. A machine learning classifier allows for a greater degree of accuracy than could be obtained from human observation of the acoustic spectrum and automates the process. By doing so, sonobuoys can monitor a maritime space to raise an alarm at the presence of submarines or with the use of 3 or more sonobuoys, to geolocate such a submarine. In antisubmarine warfare (ASW) the ability to passively monitor extends the reach in naval defense. See, FIG. 2

DETAILED DESCRIPTION OF INVENTION

The technical issue is to detect the presence or position of a submarine using sonobuoys. Sonobuoys register not only the sound from the target, but also a cacophony of other noises present in the ocean. Other sound sources include noise from boats, animals, waves, and wind. The sound from these non-target sources is background noise and makes the target signal difficult to isolate.

Distinguishing the signal of interest from background noise has become increasingly difficult in recent years due to the development of extremely quiet submarines. In addition to this, in some environmental conditions a submarine could hide between layers of different temperatures or different salt concentrations which can greatly influence the sound propagation and make the target even harder to detect. FIG. depicts an underwater marine battlefield. In a shallow-water archipelago, these problems are further compounded by strong reverberation effects, caused by sound reflection from the sea floor, the surface, and islands, which lead to subsequent interference phenomena.

The use of machine learning techniques in signal processing is demanded by the complex marine environment.

Random Noise Removal—Wavelet Based Denoising

Figure 1:
FIG. 1 is a block diagram of the method.
Figure 2:
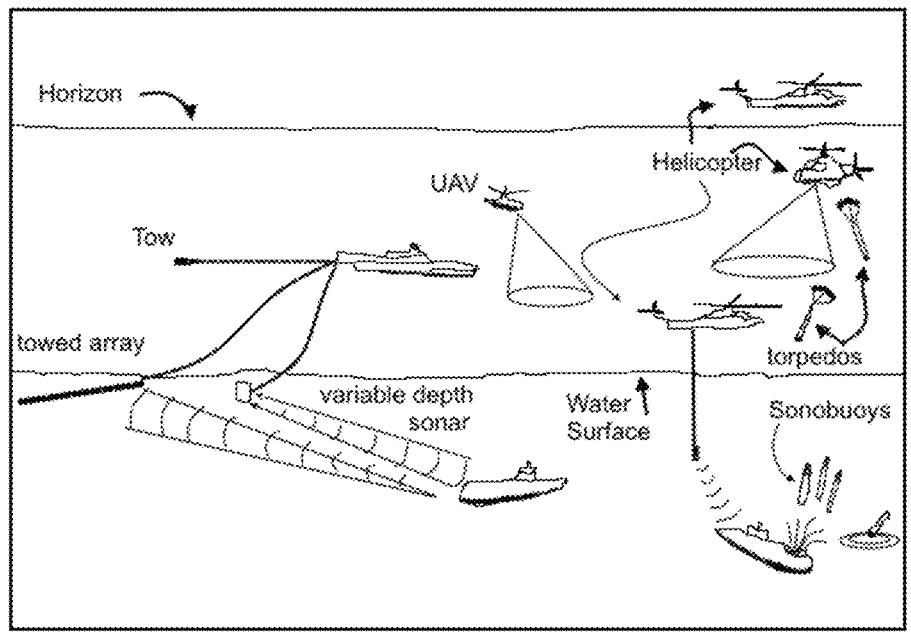
FIG. 2 is an illustration of the underwater battlefield.
Figure 3:
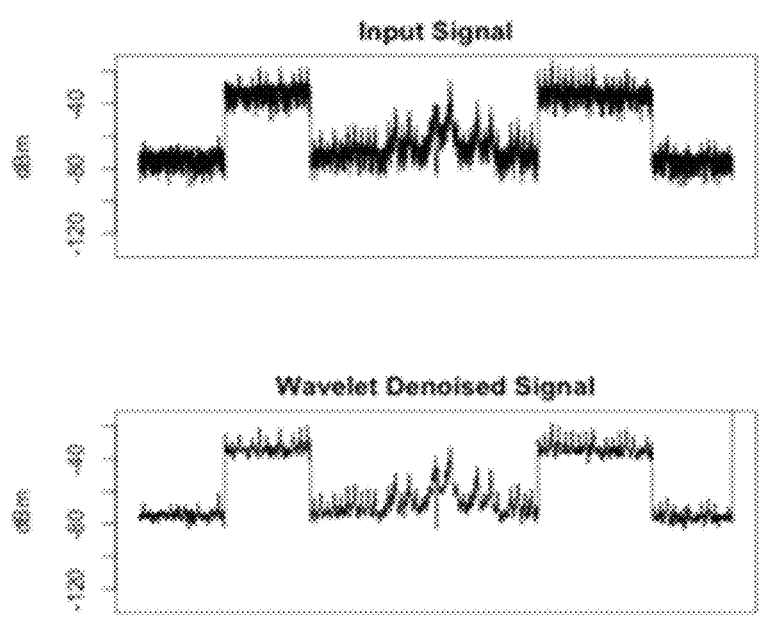
FIG. 3 is a comparison of the input signal and denoised signal spectra.
Figure 6:
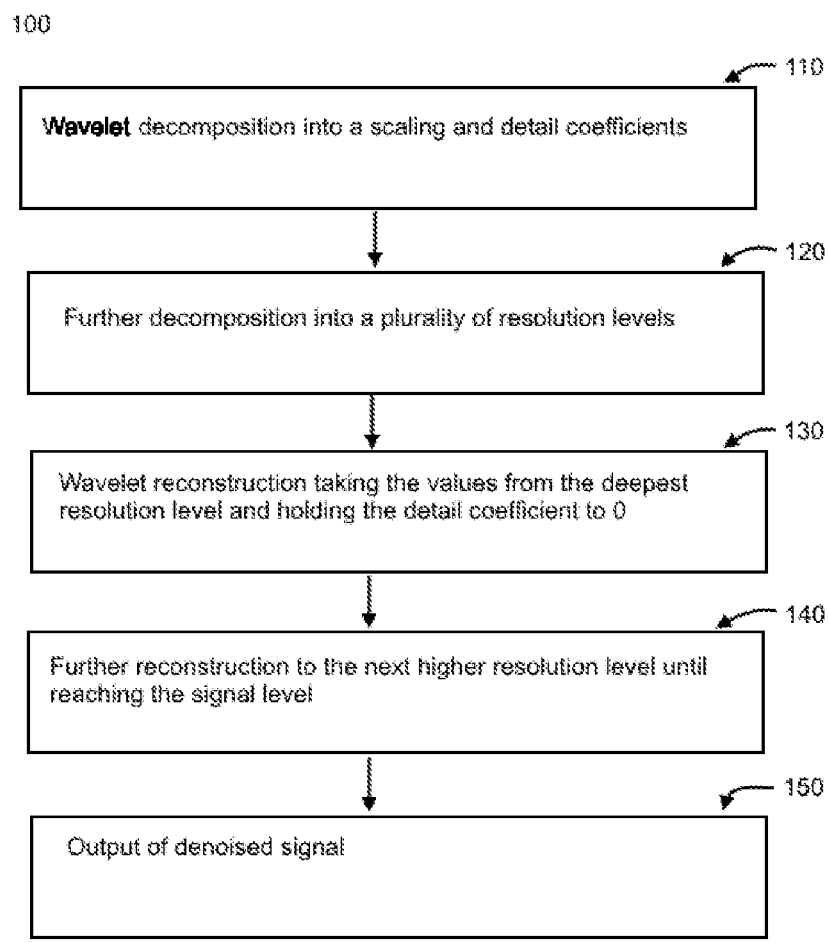
FIG. 6 is a flow chart of the wavelet denoising

FIG. 1 is a block diagram illustrating the method. The first stage is to minimize random background noise. The conventional noise reduction method is signal averaging. It is a powerful method, but it requires repeated instances of signal acquisition and is not practical of transient signals. The time for signal averaging will not be effective for a submerged submarine underway in a space being monitored for detection or location. Transient signals using the averaging method of denoising are dominated by the background noise. Instead wavelet denoising eliminates these problems. This technique processes the signal by treating the background random noise as additive white Gaussian noise. Wavelet-based denoising requires only one time segment to perform the noise minimization while maintaining the strength of a transient signal. FIG. 3 shows the spectra of an input signal and the denoised signal. FIG. 6 is a flow chart of the denoising process 100. The wavelet is decomposed 110 into a scaling and a detail coefficient. It is further decomposed 120. Passing on the scaling coefficient into a plurality of successive resolution levels. The wavelet is then reconstructed 130 by taking the values from the deepest resolution level and holding the detail coefficient to 0. The wavelet is further reconstructed 140 to the next higher resolution level successively until reaching the original signal level. The denoised signal is then output 150 for further processing.

Signal Enhancement—Autocorrelation

Figure 4:
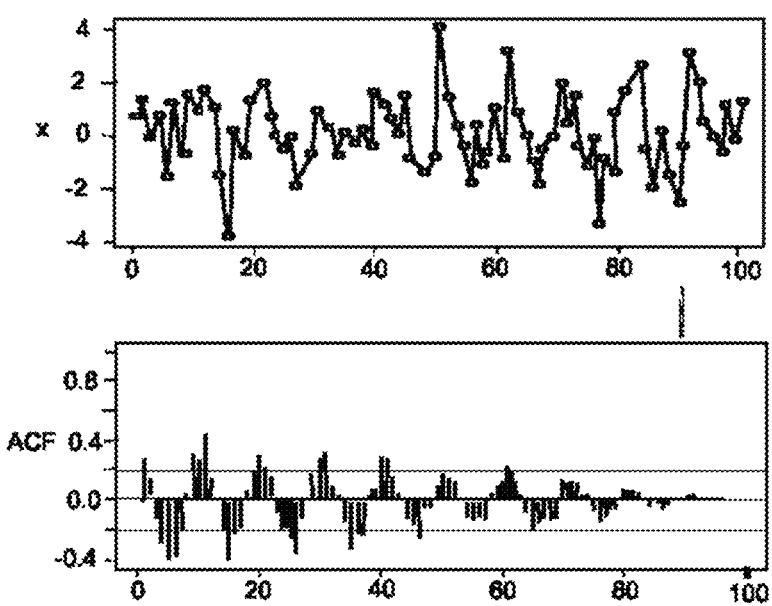
FIG. 4 is illustrating autocorrelation enhancement on random data point to a concealed sine wave.

The second stage of processing as described in FIG. 1 is signal source enhancement. The denoised signal is autocorrelated. Autocorrelation is a cross-correlation of a signal sequence with itself. It is capable of extracting repetitive patterns from random time series data. It is can be used to enhance the characteristics of target signals such as submarines in low signal-to-noise ratio (SNR) environments. FIG. 4 is an example of randomly generated data points that are processed by an autocorrelation function (ACF) to reveal a sine wave. FIG. 4 illustrates the capability of an autocorrelation process to extract a regular pattern as show on the bottom plot, from a time series data as shown on the top. This characteristic of autocorrelation is useful for monitoring submarine acoustic generators that produces normal regular signal patterns and for discerning any abnormalities in these regular patterns.

Signal Source Isolation

Wavelet Based Signal Source Feature Extraction

Figure 5:
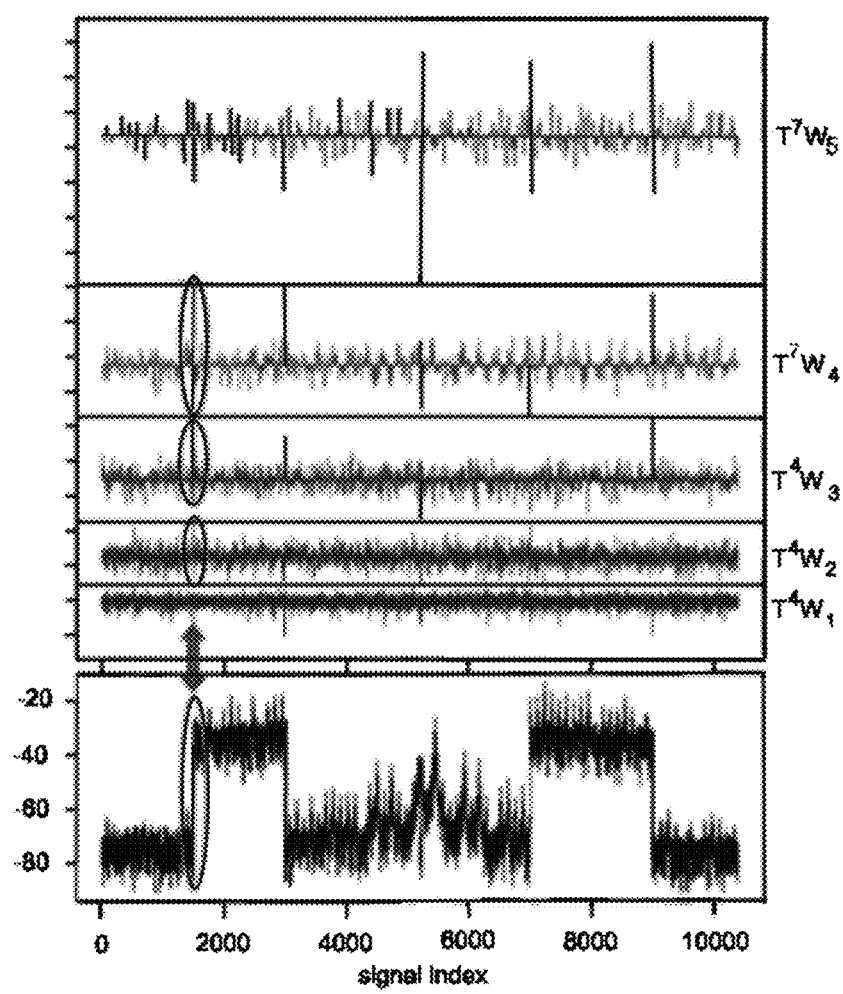
FIG. 5 is an illustration of wavelet transformation of the original time series data compared to multi-scale wavelet transforms.

Abrupt changes can be characterized by local maximum detection of the wavelet transform, as illustrated in FIG. 5.

The wavelet process is a multi-resolution process. The advantage of the multi-resolution process is that the input data and their transforms are tightly connected through the extracted features. In addition, the magnitudes of the identified features in multiple resolution spaces are less than the magnitudes in the original input data, which will improve the processing speed. Wavelet analysis stands out as a multi-resolution analysis technique due to its capability to capture the time-varying changes on time series data. The detail coefficients of wavelet decomposition reflect the magnitude changes of the time series data, as illustrated in FIG. 5. The wavelet multi-resolution mechanism decomposes the time series data as shown on the bottom plot of FIG. 5 into multiple resolution spaces to jointly characterize the magnitude changes in the data as shown on the other plots on FIG. 5. The magnitudes of the detail coefficients, that is the wavelet coefficients at each resolution level (W1 or W2 or W3 or W4 or W5) are extracted. Because at each resolution level the mean of the wavelet coefficients is zero, the magnitude changes can be better characterized without affecting unleveled magnitudes along the data.

Waveform Matching and Curve Fitting

To discern the source signals from the background signals, waveform matching techniques is applied. First, a mask is applied to a bundle of training data waveforms. To apply the waveform matching or curve fitting, a generated mask is overlapped on testing waveform and then the difference between the mask and testing waveform is calculated.

Waveform matching can be done in any signal representation domain such as time domain, frequency domain, or time-frequency domain to minimize interference and background noise.

Convolutional Neural Network (CNN)

Figure 7A:
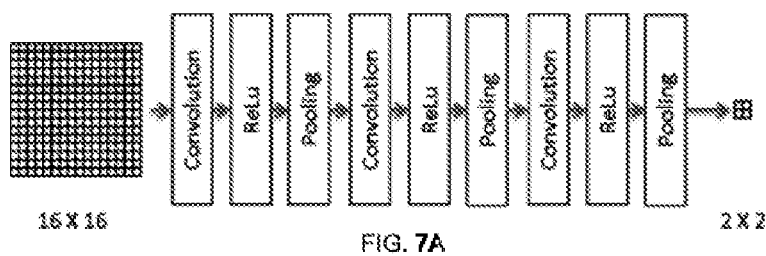
FIG. 7A is a CNN architecture.
Figure 7B:
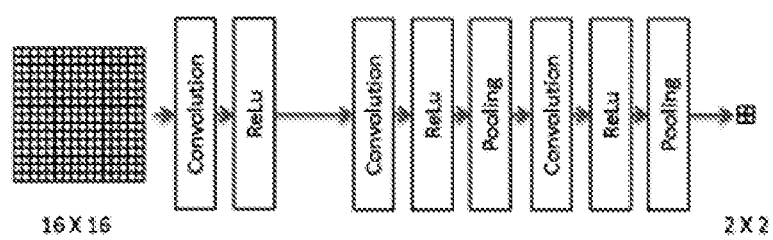
FIG. 7B is a second embodiment of CNN architecture.

A typical CNN consists of a number of different layers stacked together in a deep architecture: an input layer, a group of convolutional and pooling layers. FIGS. 7a and 7b illustrate two embodiments of CNN architecture with a limited number of fully connected hidden layers, and an output layer. The actual difference, when compared to the multilayer perceptron, lies in the introduction of a combination of convolution and pooling operations.

A convolutional layer organizes hidden units that aims to take advantage of the local structure present in the two-dimensional input data. Each hidden unit, instead of being connected to all the inputs coming from the previous layer, is limited to processing only a tiny part of the whole input space (e.g. small 3×3 blocks of pixels), called its receptive field. The weights of such a hidden unit create a convolutional kernel (filter) which is applied to (tiled over) the whole input space, resulting in a feature map. This way, one set of weights can be reused for the whole input space. This is based on the premise that locally useful features will also be useful in other places of the input space This is a mechanism which not only vastly reduces the number of parameters to estimate, but also improves the robustness to translational shifts of the data. A typical convolutional layer will consist of numerous filters (feature maps). Dimensionality reduction can be achieved through pooling layers, which merge adjacent cells of a feature map. The most common pooling operations performed are taking the max, winner takes all, or mean of the input cells. This downsampling further improves invariance to translations. This invariance improves the signal source isolation.

Recent implementations of deep architectures have unequivocally replaced them with alternative solutions.

The preferred architecture and activation function is rectifier linear unit (ReLu), in the form of:

$$f(x)=\max(0,x)$$

ReLu has several advantages over traditional units: faster computation, more efficient gradient propagation as it does not saturate like sigmoid units, biological plausibility of one-sidedness, and a sparse activation structure, while retaining sufficient discriminatory properties despite their simplicity. Other activation functions such as logistic sigmoids and hyperbolic tangents are used as non-linear activation functions in a multilayer perceptron.

The complex marine acoustic environment with reflection, interference and thermal layering makes it difficult identify the identity and location of acoustic sources. The strength of CNN lies with its ability to learn through weight-sharing and pooling the localized patterns, which are present in the spectro-temporal features of spectrograms. Thus, CNNs are suitable for classification on time-frequency acoustic data. Signal sources include submarines, in-band interferers, and noise are examined using a CNN.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

I claim:

1. A method of identifying an underwater source of a sound based on an acquired signal from listening devices, the method comprising:
   a. decomposing the acquired signal into a plurality of resolution levels by:
      dividing the acquired signal into a first resolution level of two groups, a first scaling coefficient group and a first detail coefficient group,
      deconstructing successive resolution levels by further decomposing first scaling coefficients into at least a second scaling coefficient subgroup and a second detail coefficient group, and further decomposing previous resolution level at each successive resolution level;
b. integrating the acquired signal at each resolution level resulting in a denoised signal;
c. enhancing said denoised signal by autocorrelation; and
d. identifying said underwater source by extracting signal characteristics of said denoised signal.

2. The method of claim 1 wherein the identifying the underwater source comprises using a trained convolutional neural network (CNN) with a plurality of convolutions.

3. The method of claim 1 wherein the identifying the underwater source comprises one or more of waveform curve fitting.

4. The method of claim 1 wherein the identifying the underwater source further comprises locating a position of the underwater source from the acquired signal from said listening devices.

5. A method of detecting an underwater source of an acoustic signal acquired by a listening device, the method comprising:
a. decomposing the acoustic signal into one or more resolution levels;
b. integrating the acoustic signal at each resolution level resulting in a denoised signal;
c. enhancing the denoised signal by autocorrelation;
d. processing the denoised signal with a convolutional neural network (CNN), the CNN having one or more convolutional levels, one or more activation functions levels, and one or more pooling levels;
e. training said CNN with a training data set;
f. assigning weights and biases to each convolution level;
g. measuring an error of classification of the each convolution level by comparing the classification by the CNN to the training data set;
h. adjusting the weights and biases;
i. repeating processing by the CNN with the training data set until an error rate stabilizes; and
j. detecting the underwater source by the CNN.

6. The method of claim 5 wherein an activation function comprises one or a combination of, a group of a sigmoid function, a hyperbolic tangent, and a rectifier function.

7. The method of claim 5 further comprising dividing the acoustic signal into the training data set and a validation data set, classifying the validation data set, processing the validation data set after the error rate stabilizes, and measuring the error rate.

8. The method according to claim 5 wherein hyperparameters of the weights and biases are one or more of a learning rate, a batch size, and number of epochs.

9. A method, comprising:
decomposing a waveform signal in a signal domain into a plurality of resolution levels;
selecting, with a trained model, a resolution level from the plurality of resolution levels to be reconstructed back to the signal domain;
reconstructing, using a scaling coefficient, the waveform signal in a selected resolution level back to the signal domain through each previous resolution level; and
discerning a source of the waveform signal from a background noise.

10. The method of claim 9, further comprising extracting signal characteristics from the waveform signal.

11. The method of claim 9, further comprising acquiring the waveform signal as an underwater waveform signal from underwater listening devices and identifying an underwater source of the underwater waveform signal with an autocorrelation.

12. The method of claim 11, wherein identifying the underwater source comprises using a waveform curve fitting.

13. The method of claim 9, wherein decomposing the waveform signal comprises:
dividing the waveform signal into a first resolution level of two groups, a first scaling coefficient group and a first detail coefficient group;
deconstructing successive resolution levels by further decomposing the first scaling coefficient group into at least a second scaling coefficient subgroup and a second detail coefficient group; and
further decomposing previous resolution level at each successive resolution level.

14. The method of claim 9, wherein discerning the waveform signal from the background noise comprises overlapping a mask onto a testing waveform and calculating a difference between the mask and the testing waveform.

15. A method of training a model, the method comprising:
decomposing a waveform signal in a signal domain into a plurality of resolution levels;
selecting, with a trained model, a resolution level from the plurality of resolution levels to be reconstructed back to the signal domain;
reconstructing, a denoised waveform signal in selected resolution level back to the signal domain through each previous resolution level to discern a source of the denoised waveform signal from a background noise;
processing the denoised waveform signal with a convolutional neural network (CNN), the CNN having one or more convolutional levels, one or more activation functions levels, and one or more pooling levels;
training the CNN with a training data set;
assigning weights and biases to each artificial neuron of the CNN;
adjusting the weights and biases by measuring an error of classification; and
repeating processing by the CNN with the training data set until an error rate stabilizes.

16. The method of claim 15, wherein measuring the error of classification comprises comparing the classification by the CNN to the training data set.

17. The method of claim 16, wherein an activation function comprises one or a combination of, a group of a sigmoid function, hyperbolic tangent, or rectifier function.

18. The method of claim 15, further comprising dividing the waveform signal into the training data set and a validation data set, classifying the validation data set, processing the validation data set after an error rate stabilizes, and measuring the error rate.

19. The method according to claim 15, wherein hyperparameters of the weights and biases comprise one or more of a learning rate, a batch size, and number of epochs.

20. A method, comprising:
removing, with a wavelet analysis, a random noise in an acoustic signal, resulting in a denoised signal;
enhancing a signal source of the acoustic signal by autocorrelating the denoised signal;
isolating the signal source, comprising:
extracting features with the wavelet analysis,
matching a waveform by overlapping a mask onto a testing waveform and calculating a difference between the mask and the testing waveform, and
processing the denoised signal with a convolutional neural network (CNN); and
identifying the signal source of the acoustic signal from a background noise.

21. A method, comprising:
   decomposing a waveform signal in a signal domain into a plurality of resolution levels;
   selecting, with a trained model, a resolution level from the plurality of resolution levels to be reconstructed back to the signal domain;
   reconstructing the waveform signal in a selected resolution level back to the signal domain through each previous resolution level;
   discerning a source of the waveform signal from a background noise; and
   acquiring the waveform signal as an underwater waveform signal from underwater listening devices and identifying an underwater source of the underwater waveform signal with an autocorrelation.

22. The method of claim 21, wherein reconstructing the waveform signal comprises using a scaling coefficient.

23. A method, comprising:
   decomposing a waveform signal in a signal domain into a plurality of resolution levels, the decomposing including at least:
      dividing the waveform signal into a first resolution level of two groups, a first scaling coefficient group and a first detail coefficient group,
      deconstructing successive resolution levels by further decomposing the first scaling coefficient group into at least a second scaling coefficient subgroup and a second detail coefficient group, and
      further decomposing previous resolution level at each successive resolution level;
   selecting, with a trained model, a resolution level from the plurality of resolution levels to be reconstructed back to the signal domain;
   reconstructing the waveform signal in a selected resolution level back to the signal domain through each previous resolution level; and
   discerning a source of the waveform signal from a background noise.

24. A method, comprising:
   decomposing a waveform signal in a signal domain into a plurality of resolution levels;
   selecting, with a trained model, a resolution level from the plurality of resolution levels to be reconstructed back to the signal domain;
   reconstructing the waveform signal in a selected resolution level back to the signal domain through each previous resolution level; and
   discerning a source of the waveform signal from a background noise, the discerning including at least overlapping a mask onto a testing waveform and calculating a difference between the mask and the testing waveform.

* * * * *